F. S. BRYANT.
REINFORCEMENT FOR PNEUMATIC TIRES.
APPLICATION FILED MAR. 18, 1916.
1,222,729. Patented Apr. 17, 1917.
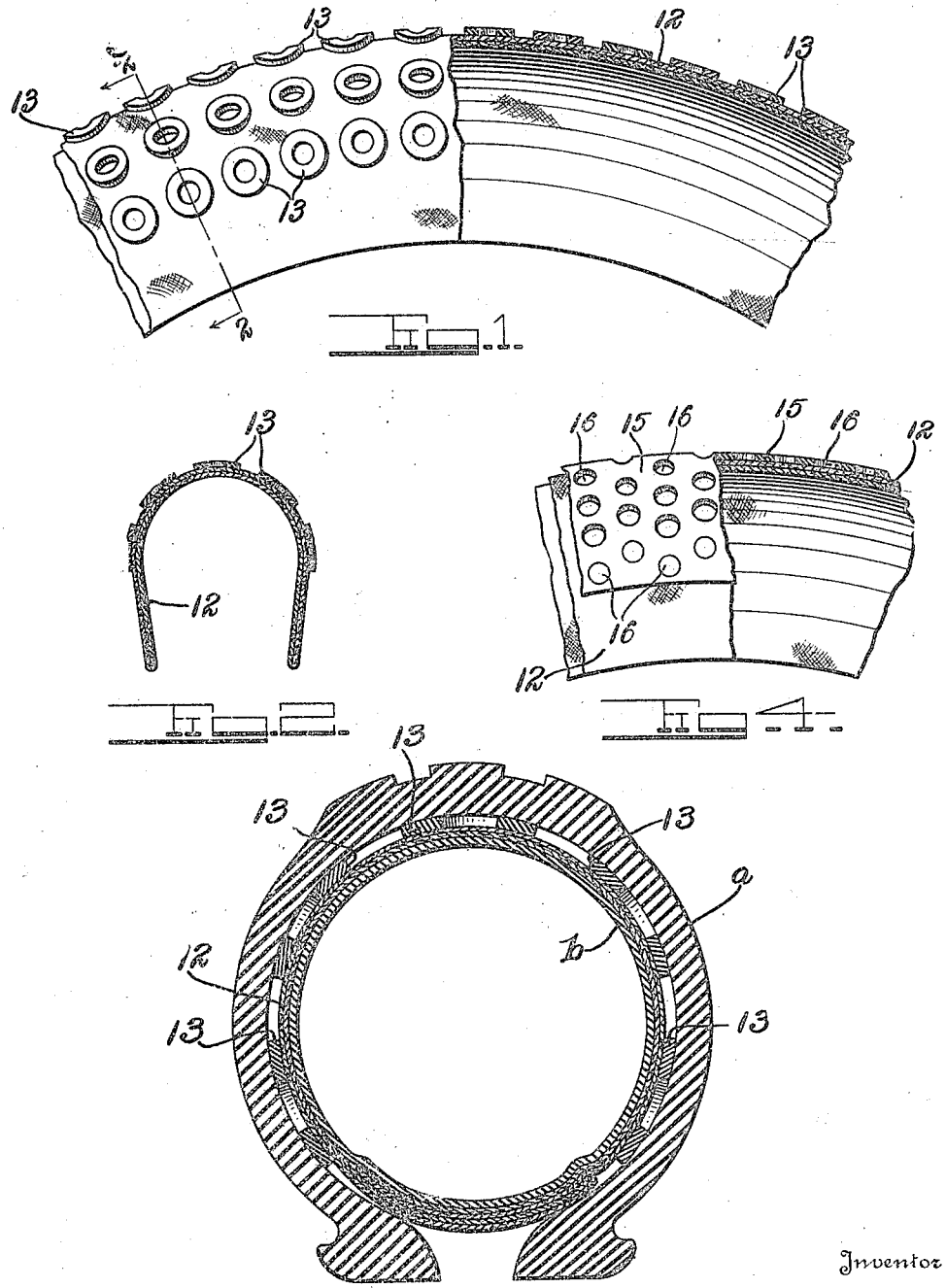

UNITED STATES PATENT OFFICE.

FREDRICK S. BRYANT, OF READING, MASSACHUSETTS.

REINFORCEMENT FOR PNEUMATIC TIRES.

1,222,729.  Specification of Letters Patent.  Patented Apr. 17, 1917.

Application filed March 18, 1916. Serial No. 85,186.

*To all whom it may concern:*

Be it known that I, FREDRICK S. BRYANT, a citizen of the United States, residing at Reading, in the county of Middlesex and State of Massachusetts, have invented new and useful Improvements in Reinforcements for Pneumatic Tires, of which the following is a specification:

This invention relates to a reinforcement, such as a patch or an interlining, interposed between the inflated inner tube and the tire shoe or carcass of a pneumatic tire. The reinforcement is usually a flexible strip formed to be wrapped around the inner tube with one edge overlapping the other and covering only a part of the circumference of the tube when formed as a patch, and the entire circumference when formed as an interlining. The material of the reinforcement is usually textile fabric such as cotton duck, two or more layers being usually employed, and the layers being frictioned and united by vulcanization.

It has been found that the outer surface of a reinforcement of this character in direct contact, as heretofore, with the inner surface of the shoe, creeps and chafes on said inner surface, so that there is an objectionable wear of both surfaces, and the temperature of both the reinforcement and shoe is materially increased. It happens therefore that the reinforcement is often worn away, and its rubber content is disintegrated until the fabric layers separate from each other to a considerable extent, so that the reinforcement becomes limp and flabby. When the reinforcement is in this condition, it is liable to be bulged outwardly into a blowout fracture in the shoe by the air pressure in the inner tube, and may bulge to such an extent as to permit the corresponding portion of the inner tube to bulge into the facture, said tube portion being therefore liable to be cut by the walls of the fracture acting through the intermediate portion of the reinforce.

My invention has for its object to provide a reinforcement which is free from the above mentioned objections.

The invention is embodied in the improvements which I will now proceed to describe and claim.

Of the accompanying drawings forming a part of this specification:

Figure 1 represents a side view, partly in section, of a reinforcement embodying my invention, formed as a patch;

Fig. 2 represents a section on line 2—2 of Fig. 1;

Fig. 3 represents a transverse section of a pneumatic tire having a reinforcement embodying my invention, wrapped around the inner tube;

Fig. 4 represents a view similar to Fig. 1, showing a modification.

The same reference characters indicate the same or similar parts in all the views.

In the drawings, *a* represents the shoe or carcass, and *b* the inflated inner tube of a pneumatic tire.

My improved reinforce, which is formed to be wrapped around the inner tube and cover any desired extent of its circumference, comprises a body 12 made of two or more layers of frictioned textile fabric vulcanized together and molded into a U-shape in cross section, and a spacing grid secured to the outer surface of the body.

In the embodiment of the invention shown by Figs. 1, 2 and 3, a plurality of independent rings or grid members 13, preferably of rubber which is somewhat compressible and elastic when vulcanized, constitute the spacing grid. Said members are firmly united by vulcanization or otherwise to the body 12 to form practically inseparable parts thereof, and are preferably spaced, as shown by Figs. 1 and 2, the arrangement being such that when the reinforcement is interposed between the shoe *a* and the inflated inner tube *b*, the grid members prevent contact between the body 12 and the outer and side portions of the shoe, and form numerous air spaces between the inner surface of the shoe and the outer surface of the body 12. The margins of said air spaces formed by the outer and inner edges of the grid members constitute shoulders which face in many different directions and engage the inner surface of the shoe in such manner as to prevent displacement or relative movement of the reinforcement in any direction. It will be seen therefore that the body 12 is free from chafing contact with all portions of the shoe which are flexed to any considerable extent when in use, viz., the outer and side portions. Contact between the body 12 and the edge portions of the shoe, as shown by Fig. 3, is not objectionable, because these portions have little or no movement due to flexure.

The material of the grid is sufficiently yielding to enable the surfaces bearing on the inner surface of the shoe to cling frictionally to said inner surface when pressed outwardly against it by the air pressure in the inner tube, so that the grid is practically as immovable relatively to the shoe as it would be if vulcanized to the shoe.

I have found that this freedom of the reinforcement body from chafing contact with the shoe and the air spaces provided as described reduce the wear and temperature of the associated parts to the minimum. I have also found that in case of a blow-out in the shoe, the spacing grid prevents the portion of the reinforcement body nearest the blow-out from being forced thereinto by the air pressure in the inner tube, the integrity and relative stiffness of the said body being maintained as above described.

Fig. 4 shows a modified form of spacing grid composed of a layer 15 of rubber similar to that of which the members 13 are made, said layer being provided with holes 16, and vulcanized to the body 12. The holes 16 form air spaces, and their margins form shoe-engaging shoulders facing in many directions. The spacing grid does not extend to the edges of the body, the edge portions of said body projecting from the grid sufficiently to be overlapped, as shown by Fig. 3.

It is obvious that the spacing grid may be formed in various other ways, and that the reinforcement may be formed as a patch covering only a part of the circumference of the inner tube, as indicated by Fig. 1, or as an interlining covering the entire circumference of the inner tube.

Having described my invention, I claim:

A pneumatic tire reinforcement comprising a body approximately U-shaped in cross section, formed of frictional textile material, and having flexible overlapping edge portions, and a spacing grid of compressible elastic rubber, attached to the exterior of said body and provided with means for forming a plurality of uniform air spaces of corresponding shape and depth having straight side walls, the margins of which constitute yieldable shoulders capable of frictional engagement with a tire shoe, said body forming substantially flat bottom walls for said spaces.

In testimony whereof I have affixed my signature.

FREDRICK S. BRYANT.